(12) United States Patent
Murata et al.

(10) Patent No.: US 10,281,858 B2
(45) Date of Patent: May 7, 2019

(54) ROLLER WITH ELASTIC LAYERS HAVING DIFFERENT INDENTATION ELASTIC MODULI, AND FIXING DEVICE HAVING ROLLER

(71) Applicant: CANON KABUSHIKI KAISHA, Tokyo (JP)

(72) Inventors: Naofumi Murata, Tokyo (JP); Shoichiro Ikegami, Yokohama (JP); Yutaka Arai, Kawasaki (JP); Jun Miura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/014,256

(22) Filed: Jun. 21, 2018

(65) Prior Publication Data

US 2018/0373183 A1 Dec. 27, 2018

(30) Foreign Application Priority Data

Jun. 23, 2017 (JP) .................... 2017-122924

(51) Int. Cl.
*G03G 15/20* (2006.01)
*B32B 1/08* (2006.01)
(Continued)

(52) U.S. Cl.
CPC ............. *G03G 15/206* (2013.01); *B32B 1/08* (2013.01); *B32B 7/02* (2013.01); *B32B 25/042* (2013.01); *B32B 2250/03* (2013.01); *B32B 2250/248* (2013.01); *B32B 2305/026* (2013.01); *B32B 2305/30* (2013.01); *B32B 2307/302* (2013.01); *B32B 2307/51* (2013.01); *B32B 2319/00* (2013.01); *G03G 2215/00451* (2013.01)

(58) Field of Classification Search
CPC .................................................... G03G 15/206
USPC .......................................................... 399/329
See application file for complete search history.

(56) References Cited

U.S. PATENT DOCUMENTS 6,459,878 B1 10/2002 Tomoyuki et al.
7,941,063 B2 * 5/2011 Suzuki ................. G03G 15/657
399/43

(Continued)

FOREIGN PATENT DOCUMENTS

JP 9-114281 A 5/1997
JP 2000-352892 A 12/2000
(Continued)

OTHER PUBLICATIONS

Ikegami et al., U.S. Appl. No. 16/038,441, filed Jul. 18, 2108.

*Primary Examiner* — Quana Grainger
(74) *Attorney, Agent, or Firm* — Venable LLP

(57) ABSTRACT

A roller usable in an image fixing device for an electrophotographic image forming apparatus includes a first elastic layer; a second elastic layer provided closer to a center of the roller than the first elastic layer, the second elastic layer having a thermal conductivity in a thickness direction higher than that of the first elastic layer; a third elastic layer provided between the first elastic layer and the second elastic layer, wherein an indentation elastic modulus EIT1 of the first elastic layer, an indentation elastic modulus EIT2 of the second elastic layer, and an indentation elastic modulus of the third elastic layer satisfy $E_{1T1} < E_{1T3} < E_{1T2}$.

15 Claims, 6 Drawing Sheets

(51) Int. Cl.
    *B32B 7/02*      (2019.01)
    *B32B 25/04*     (2006.01)

(56)          References Cited

U.S. PATENT DOCUMENTS 9,134,664  B2      9/2015   Miura et al.
    9,152,110  B2     10/2015   Miura et al.
    9,268,273  B2      2/2016   Miyahara et al.
    9,304,461  B2      4/2016   Miura et al.
    9,335,690  B2      5/2016   Asaka et al.
    9,348,282  B2      5/2016   Tamura et al.
    9,348,283  B2      5/2016   Takada et al.
    9,367,009  B2      6/2016   Akiyama et al.
    9,671,731  B2 *    6/2017   Matsunaka .......... G03G 15/206
    9,817,348  B2     11/2017   Murata et al.
 2005/0141935  A1 *    6/2005   Chen ................. G03G 15/2053
                                                              399/333
 2010/0330374  A1 *   12/2010   Kimura .............. G03G 15/2057
                                                              428/421

FOREIGN PATENT DOCUMENTS

JP        2001-032825  A     2/2001
    JP        2002-148988  A     5/2002
    JP        2006-251620  A     9/2006
    JP        2012-163812  A     8/2012
    JP        2015-114368  A     6/2015

* cited by examiner (a)

(b)

| COUNT | 0 | 50000 | 100000 | 150000 | 225000 | 300000 |
|---|---|---|---|---|---|---|
| EMB.1 | ○ | ○ | ○ | ○ | ○ | ○ |
| PRIOR ART | ○ | ○ | × | × | × | × |

ROLLER WITH ELASTIC LAYERS HAVING DIFFERENT INDENTATION ELASTIC MODULI, AND FIXING DEVICE HAVING ROLLER

FIELD OF THE INVENTION AND RELATED ART

The present invention relates to a fixing apparatus mountable in an image forming apparatus such as a copying machine, a printing machine, and a facsimile machine. It relates also to a roller employed by such a fixing apparatus.

In recent years, it has been increasingly desired to reduce a fixing apparatus in the length of startup time, and also, in electric power consumption. Thus, there have been proposed a few pressure rollers (Japanese Laid-open Patent Application No. 2002-148988), the elastic layer of which is lower in thermal conduction, and also, is smaller in thermal capacity, than the elastic layer of any of conventional pressure rollers. These pressure rollers are substantially smaller than any of the conventional pressure rollers, in the amount by which heat disperses inward of a pressure roller from the surface of the pressure roller. Therefore, as the heating member of a fixing apparatus increases in temperature, the surface of the pressure roller can quickly increases in temperature. Thus, these pressure rollers can further reduce a fixing apparatus in the length of startup time.

However, as the elastic layer of the pressure roller of a fixing apparatus is reduced in the rate of thermal conduction, and in thermal capacity, the pressure roller is reduced in the rate with which heat disperses inward of the pressure roller. Thus, as a substantial number of narrow sheets of recording medium (small sheets of paper), in terms of the lengthwise direction of the pressure roller, are conveyed in succession through the fixing apparatus to thermally fix the toner image on each sheet, there occurs sometimes such a phenomenon that the out-of-shee-path portions of the fixation nip excessively increase in the temperature, in terms of the lengthwise direction of the fixation nip formed between the fixation film and pressure roller, when the film and roller are pressed upon each other.

In order to deal with this problem, that is, in order to reduce a fixing apparatus in the length of startup time, while preventing the out-of-sheet-path portions of the pressure roller from excessively increasing in temperature, there has been made a proposal in Japanese Laid-open Patent Application No. 2012-163812. According to this patent application, the pressure roller is provided with the first and second elastic layers. The first layer, which is the inward layer relative to the first layer, is formed of porous rubber which is relatively low in thermal conductivity. It is roughly 1 mm in thickness. The second layer, or the inward layer, is formed of rubber which is relatively high in thermal conductivity relative to the first layer.

However, some pressure rollers structured like the pressure roller disclosed in Japanese Laid-open Patent Application No. 2012-163812 were inferior in terms of durability when they were used in an environment which is high in temperature. Further, they reduced in durability as they were continuously compressed by a relatively large amount of force; their rubber layers broke in a short period of time. This shortcoming is thought to be attributable to the following phenomenon. That is, the first layer, or the thermally insulative layer, formed of such rubber that contains hollow balloons (beads), is different in elasticity from the second layer, or the heat storing rubber layer, which contains thermally conductive filler. Therefore, as the pressure roller is compressed by a large amount of force when the ambient temperature is relatively high, stress concentrates to the interface between the thermally insulative rubber layer (first elastic layer) and solid rubber layer (second elastic layer).

Further, in a case where a pressure roller structured like the one disclosed in Japanese Laid-open Patent Application No. 2012-16382, that is, a pressure roller, the thermally insulative rubber layer of which is thinner than a conventional one, is employed for a fixing apparatus in order to enable the fixing apparatus to start up quicker, and also, to minimize the amount by which the out-of-sheet-path portion of the pressure roller increases in temperature, an image forming apparatus employing the fixing apparatus was sometimes reduced in image quality (nonuniform in gloss). This phenomenon seems to be attributable to the following reason. That is, the thermally insulative layer (first layer) of this pressure roller has minute pores which are independent from each other. Therefore, as the gaseous substances in the minute pores expand as heat is applied to the pressure roller, and/or gaseous substances in the minute pores increase in pressure as the pressure roller is pressed. Consequently, the pressure roller becomes nonuniform in the amount of pressure it applies to a sheet of paper.

Thus, the primary object of the present invention is to provided a roller (pressure roller) which is substantially more durable than any conventional pressure roller, in an environment in which it is continuously subjected to high temperature and high pressure, and yet, is superior (shorter in length of startup time, and lower in out-of-sheet-path temperature increase) to any conventional pressure roller. Further, it is to provide a fixing apparatus employing such a pressure roller.

SUMMARY OF THE INVENTION

According to an aspect of the present invention, there is provided a roller usable in a fixing device for fixing, on a recording material, an unfixed toner image formed thereon, said roller comprising a first elastic layer; a second elastic layer provided closer to a center of said roller than said first elastic layer, said second elastic layer having a thermal conductivity in a thickness direction higher than that of said first elastic layer; a third elastic layer provided between said first elastic layer and said second elastic layer, wherein an indentation elastic modulus EIT1 of said first elastic layer, an indentation elastic modulus EIT2 of said second elastic layer, and an indentation elastic modulus of said third elastic layer satisfy $E_{1T1} < E_{1T3} < E_{1T2}$.

Further features of the present invention will become apparent from the following description of exemplary embodiments with reference to the attached drawings.

BRIEF DESCRIPTION OF THE DRAWINGS

Parts (a) and (b) of FIG. 1 illustrate the pressure roller in the first embodiment of the present invention.

DESCRIPTION OF THE EMBODIMENTS

Hereinafter, a couple of preferred embodiments of the present invention are described with reference to appended drawings.

«Embodiment 1»

(Image forming apparatus)

Figure 2:
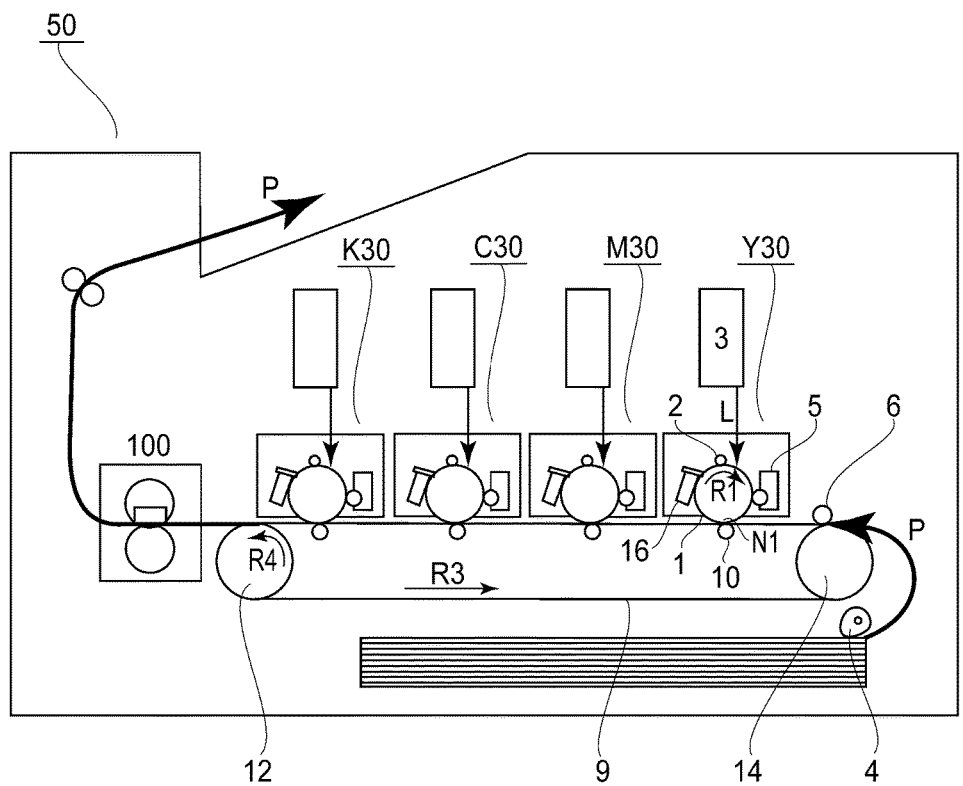
FIG. 2 is a sectional view of a typical image forming apparatus having a fixing apparatus in accordance with the present invention is mountable.

Shown in FIG. 2 is a typical image forming apparatus which has a fixing apparatus in accordance with the present invention. The image forming apparatus 50 in FIG. 2 is provided with the four image forming portions, which form yellow, magenta, cyan, and black toner images, one for one. It forms a full-color image by sequentially transferring four monochromatic images which are different in color, more specifically, yellow, magenta, cyan and black toner images, onto a sheet P of recording medium (recording paper) held on the surface of a recording medium conveyance belt 9. Each of the four image forming portions with which the image forming apparatus 50 is provided is provided with a photosensitive drum 1. Further, each image forming portion is provided with a charging device 2, an exposing apparatus 3 for projecting a beam of laser light upon the peripheral surface of the photosensitive drum 1, a developing device 5, and a drum cleaner 16, which are disposed in the adjacencies of the peripheral surface of the photosensitive drum 1, in the listed order in terms of the rotational direction (indicated by arrow mark R1) of the photosensitive drum 1. Further, the image forming apparatus 50 is provided with a transfer roller 10, which is disposed in a manner to oppose the photosensitive drum 1 with the presence of the recording medium conveyance belt 9 between itself and photosensitive drum 1.

The peripheral surface of the photosensitive drum 1 is negatively charged by the charging device 2. Then the charged portion of the peripheral surface of the photosensitive drum 1 is exposed to a beam L of exposure light emitted by an exposing means 3. As a result, an electrostatic latent image is formed on the peripheral surface of the photosensitive drum 1 (as a give point of the peripheral surface of the photosensitive drum 1 is exposed, its surface potential is reduced. In this embodiment, toner is negatively charged regardless of its color. First, negatively charged yellow toner is adhered to the peripheral surface of the photosensitive drum 1, in the pattern of the electrostatic latent image, by the developing device 5 which contains yellow toner (first color). Thus, a yellow toner image is formed on the peripheral surface of the photosensitive drum 1.

As for the recording medium conveyance belt 9, it is rotationally moved in the direction indicated by an arrow mark R3 by a driver roller 12, which is supported by two supporting shafts (driver roller 12 and tension roller 14). As for a sheet P of recording medium, as it is fed into the main assembly of the image forming apparatus 50 by a feed roller 4, it is charged by a adhesion roller 6 to which positive bias is being applied. Thus, it is electrostatically adhered to the belt 9. Then, it is conveyed further by the recording medium conveyance belt 9.

As the sheet P of recording medium arrives at a transfer nip N1, positive transfer bias (opposite in polarity from toner polarity) is applied to the transfer roller 10, which is being rotated by the recording medium conveyance belt 9, from an unshown electric power source. Thus, the yellow toner on the photosensitive drum 1 is transferred onto the sheet P, in the transfer nip N1. After the transfer, the peripheral surface of the photosensitive drum 1 is cleaned by the drum cleaner 16 having an elastic blade; the toner remaining on the peripheral surface of the photosensitive drum 1 is removed by the blade.

The above-described sequential image formation steps, more specifically, charging, exposing, transferring, and cleaning steps are carried out also by the second (magenta M30), third (cyan C30) and fourth (black K30) development cartridges. Consequently, four monochromatic toner images, different in color, are formed on the sheet P of recording medium on the recording medium conveyance belt 9. Then, the sheet P, which is bearing the four toner images, different in color, is conveyed to a fixing apparatus 100, in which the toner images on the sheet P are thermally fixed to the sheet P.

(Fixing apparatus)

Figure 3:
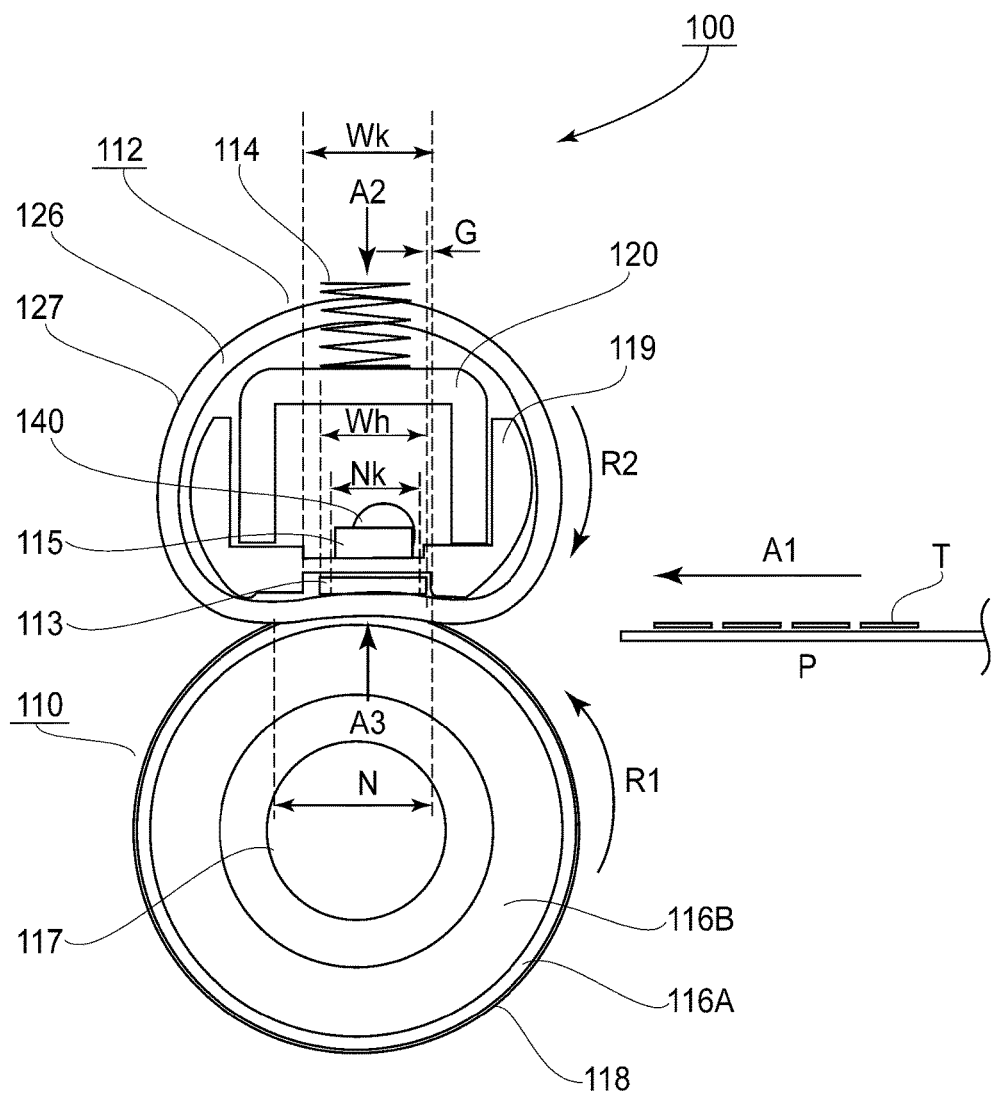
FIG. 3 is a sectional view of the fixing apparatus in the first embodiment.

FIG. 3 shows a fixing apparatus in this embodiment of the present invention. It is of the so-called film heating type. It has a fixation film 112 and a pressure roller 110. The fixation film 112 is an endless belt, and is rotationally movable. The fixing apparatus 100 has a fixation nip N, which is formed between the fixation film 112 and pressure roller 110, and through which a sheet P of recording medium, which is bearing the toner images, is conveyed while remaining pinched between the fixation film 112 and pressure roller 110.

Further, the fixing apparatus 100 is provided with a heater 113 and a heater holder 119 (holding member). It is structured so that the heater 113 is held by the heater holder 119, and also, so that the fixation film 112 (rotational member) which is flexible and cylindrical, fits around the combination of the heater 113 and heater holder 119. Further, the fixing apparatus 100 is structured so that the pressure roller 110 (pressing member) is kept pressed against the heater 113 in a manner to sandwich the fixation film 112 between itself and heater 113. Thus, the heater 113 is in contact with the inward surface of the fixation film 112, forming thereby an internal nip Nk, in which the heat from the heater 113 transfers to the fixation film 112, heating thereby the fixation film 112.

As the pressure roller 110 is driven in the direction indicated by an arrow mark R1 in the drawing, the fixation film 112 receives driving force from the pressure roller 110, in the fixation nip N, and is rotated by the received force, in the direction indicated by an arrow mark R2 in the drawing. As a given portion of the fixation film 112 is moved through the fixation nip N, it is heated by the heater 113. Then, heat is transferred to the pressure roller 110 from the fixation film 112, whereby the pressure roller 110 also is heated. A sheet P of recording medium, onto which an unfixed toner image has just been transferred, is conveyed through the fixation nip N from the direction indicated by an arrow mark Al in the drawing, the heat from the fixation film 112 which is being heated in the fixation nip N, and the heat from the pressure roller 110, transfer to a combination of the sheet P and the toner image T thereon. As a result, the toner image T is fixed to the sheet P.

1) Fixation film

While the fixation film 112 remains cylindrical (undeformed), its external diameter is 20 mm. It has multiple layers stacked in its thickness direction. That is, it has a laminar structure, having a substrative layer 126 for providing the film 112 with strength, and a release layer 127 for minimizing the amount by which contaminants might adhere to the outward surface of the fixation film 112.

The substrative layer 126 directly catches the heat from the heater 113. Thus, it needs to be heat-resistant. Further, it slides on the heater 113. Therefore, it needs to be resistant to frictional wear. Thus, it is desired that SUS (Stainless Steel), nickel, or the like metallic substance, or polyimide or the like heat-resistant resin is used as the material for the substrative layer 126. A metallic substance is stronger than a resinous substance, being therefore cable of being extended thinner than resin. Further, a metallic substance is higher in thermal conductivity than a resinous substance, being therefore more efficiently transfer the heat from the heater 113 to the surface of the fixation film 112 than a resinous substance.

On the other hand, a resinous substance is smaller in specific weight, being therefore smaller in thermal capacity, than metal. Thus, it is advantageous in that it is faster to warm up than a metallic substance. Further, it can be made into thin film by coating. Therefore, forming the substrative layer 126 of a resinous substance costs less than forming the sub strative layer 126 of a metallic substance. In this embodiment, polyimide resin was used as the material for the substrative layer 126 of the fixation film 112. Moreover, in order to yield the substrative layer 126 which is strong and high in thermal conductivity, carbon-based filler was added to the polyimide resin. The thinner is the substrative layer 126, the easier for the heat from the heater 113 to transfer to the surface of the pressure roller 110. However, the thinner is the substrative layer 126, the weaker it is. Therefore, the thickness of the substrative layer 126 is desired to be in a range of 15 µm-100 µm. In this embodiment, it was 50 µm.

It is desired that perfluoroalkoxy (PFA), polytetrafluoroethylene (PTFE), tetrafluoroethylene-hexafluoropropylene (FEP), or the like fluorine resin is used as the material for the release layer 127 of the fixation film 112. In this embodiment, PFA, which is superior in release property and heat resistance, among fluorine resins, was used as the material for the release layer 127.

The release layer 127 may be formed by covering the substrative layer 126 with a piece of tube formed of one of the abovementioned resinous substance, or coating the surface of the substrative layer 126 with one of the abovementioned materials. In this embodiment, the release layer 127 was formed by coating the surface of the substrative layer 126 with one of the abovementioned material, since coating is excellent in yielding a very thin layer of one of the abovementioned material. The thinner is the release layer 127, the easier for the heat from the heater 113 to transfer to the surface of the fixation film 112. However, if the release layer 127 is excessively thin, it is inferior in terms of durability. Therefore, the thickness of the release layer 127 is desired to be in a range of 5 µm-30 µm. In this embodiment, it was 10 µm.

2) Heater

The heater 113 is a heat generating member for heating the nip. It is made up of a substrate, a heat generation layer, and a protective layer. The substrate is rectangular, and is 6 mm in width, 20 mm in length, and 1 mm in thickness. The heat generation layer is a 10 µm-thick layer of Ag/Pd (silver-palladium) formed on the surface of the substrate by screen-printing. It generates heat as electric current is flowed through it. The protective layer is 50 µm in thickness, and was formed on the substrate in a manner to cover the heat generation layer.

The width of the largest sheet of recording medium usable by the image forming apparatus in this embodiment is equal to the length of a sheet of recording medium of the letter size. Thus, in order to assure that even when a sheet of recording medium, which is 216 mm in width, is conveyed in the landscape mode, it can be satisfactorily heated, the heat generation layer is given a length of 218 mm, which is long enough to afford a margin of 1 mm across the left and right end portions.

There is disposed on the back surface of the heater 113, a temperature detection element 115 for detecting the temperature of the ceramic substrate, as the substrate is increased in temperature by the heat generated by the heat generation layer. The temperature of the heater 113 is adjusted by controlling the amount by which electric current is flowed through the heat generation layer from an unshown electrode, in response to the signals from this temperature detection element 115.

There is also disposed on the back surface of the heater 113, a current-breaking element 140 for preventing the following problem. That is, if the temperature detection element 115 malfunctions, the power supply to the heater 113 cannot be properly controlled. Thus, it is possible for the heater 113 to excessively increase in temperature, making it possible for the excessive amount of heat to cause the heater 113 to fracture. In this embodiment, the current-breaking element 140 is an ordinary thermo-switch. It is connected in series to the line for supplying the heater 113 with electric power.

The fixing apparatus 100 is structured so that as the temperature of the current-breaking element 140 (temperature of back surface of heater 113) reaches 270° C., the power supply to the heater 113 is blocked by the deformation of a piece of bimetal. Thus, even if the temperature detection element malfunctions, as the temperature of the back surface of the heater 113 reaches 270° C., the heat generation by the heater 113 is interrupted by the current-breaking element 140. Therefore, it is possible to prevent the heater 113 from fracturing due to overheating.

The heat from the heater 113 which is being controlled in temperature by the temperature detection element 115 conducts from the inward surface of the fixation film 112 to the outward surface of the fixation film 112, and then, heats the peripheral surface of the pressure roller 110, in the fixation nip N. As a sheet P of recording medium, onto which an unfixed toner image T has just been transferred, is conveyed through the fixation nip N as descried above, the heat from the fixation film 112 and the heat from the pressure roller 110 conduct to the unfixed toner image T, and the sheet P on which the toner image T is present. Consequently, the unfixed toner image T is fixed to the sheet P.

3) Heater holder

Next, the heater holder 119 is described. Not only does it function as a backup member for backing up the fixation film 112 to form the nip between the fixation film 112 and pressure roller 110, but also, a guiding member for guiding the fixation film 112 as the fixation film 112 is rotationally moved.

As described above, the heater 113 is held by the heater holder 119 by being fitted in the groove with which the heater holder 119 is provided. Thus, from the standpoint of minimizing the amount by which the heat from the heater 113 is robbed by the heater holder 119, it is desired that the material for the heater holder 119 is small in thermal capacity. In this embodiment, liquid polymer (LCP), which is a heat-resistant resin, was used as the material for the heater holder 119.

The heater holder 119 is held from the opposite side from the heater 113 by a steel stay 120 for backing up the heater holder 119. The fixing apparatus 100 is structured so that the stay 120 is kept pressed, at its lengthwise ends, in the direction indicated by an arrow mark A2 in the drawing, by a pair of compression springs 114, one for one.

4) Pressure Roller 4-1) General Description

The pressure roller 110 in this embodiment is one of the two fixing members (first and second fixing members) that form the nip through which a sheet of recording medium, which bears a toner image, is conveyed while remaining pinched by the two members and while being heated. It is 20 mm in external diameter. Although the details of the pressure roller 110 will be given later, the pressure roller 110 has a metallic core, an elastic layer (3.5 mm in thickness) formed of foamed silicone rubber in a manner to wrap the metallic core, and a release layer which covers the outward surface of the elastic layer. The elastic layer has the first and second sublayers, which hereafter are referred to as the first and second elastic layers, respectively. The first elastic layer is a thermally insulative layer, and is porous. The second elastic layer is an elastic layer to which the heat from the first elastic layer is conducted. Further, the pressure roller 110 is provided with a stress reduction layer, which is disposed between the first and second elastic layers.

The pressure roller 110 in this embodiment remains excellent in terms of durability even in a high-temperature/high-pressure environment. Not only can it reduce a fixing apparatus in the length of startup time, but also, can minimize the amount by which its out-of-sheet path portions increase in temperature as a small sheet of recording medium is conveyed through the fixing apparatus (fixation nip). Therefore, it can contribute to the formation of high quality images.

That is, in the case of the pressure roller 110 in this embodiment, the stress reduction layer is provided between its first and second elastic layers, and the relationship among the three layers in terms of compression elasticity is set to a preset one. Therefore, it is very durable even if it is continuously compressed by a large amount of force in an environment which is high in temperature.

As for thermal conductivity, the first elastic layer is in a range of 0.06-0.16 W/m·K, and the second elastic layer is in a range of 0.20-2.00 W/m·K. As for specific weight, which is related to thermal capacity, the first elastic layer is in a range of roughly 0.75-0.85, and the second elastic layer is in a range of roughly 1.05-1.30.

By the way, the greater is the pressure roller 110 in surface hardness, the smaller the amount of pressure to be applied to the pressure roller 110 to form the nip. However, a pressure roller which is excessively low in surface hardness is inferior in durability. In this embodiment, therefore, a roller which was 50° in surface hardness (Asker C hardness scale: 4.9 N in load) was used as the pressure roller 110. The amount of pressure applied to the pressure roller 110 was 180 N. Further, the pressure roller 110 was rotated at 273 mm/sec in peripheral velocity.

4-2) Laminar Structure of Pressure Roller

Figure 1:
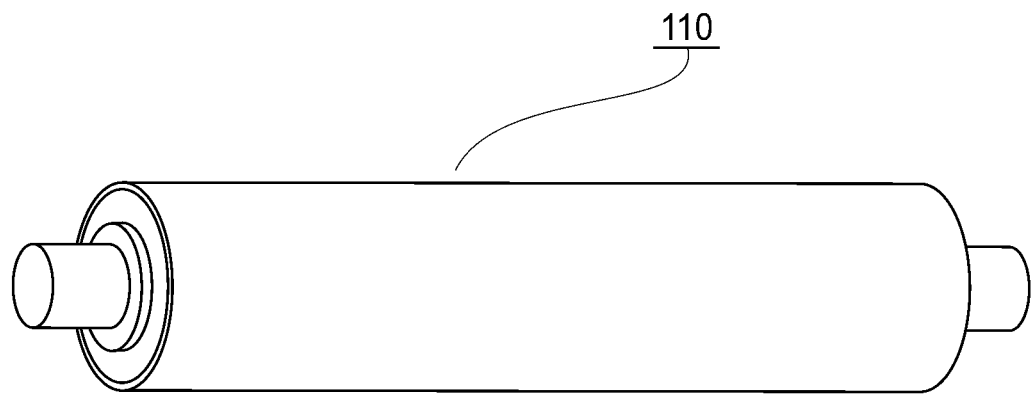
Figure 1:
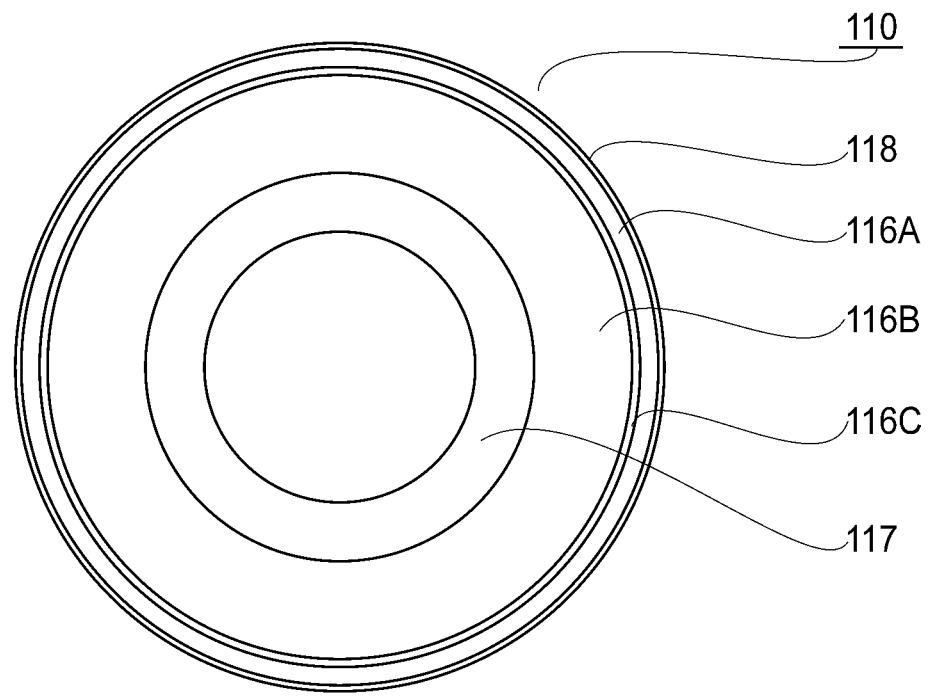

Next, the laminar structure of the pressure roller 110 is described in detail. Part (a) of FIG. 1 is a perspective view of the pressure roller 110. Part (b) of FIG. 1 is a sectional view of the pressure roller 110.

a) Metallic Core 117

The metallic core 117 is formed of iron, aluminum, or the like metallic substance. It is in the form of a piece of solid or hollow cylindrical column. It is designed to be satisfactory in terms of rigidity of which the pressure roller 110 is required. In this embodiment, a piece of solid iron column, which was 13 mm in external diameter, was used as the metallic core of the pressure roller 110.

b) First Elastic Layer 116A

The first elastic layer 116A is formed of porous silicone rubber, which is effective to reduce a fixing apparatus in the length of startup time. As porous silicone rubber, a mixture of liquid silicone rubber which is curable by addition (which hereafter may be referred to as "addition-curable liquid silicone rubber"), and hollow balloons (beads) dispersed in the silicone rubber, a mixture of silicone rubber and foaming agent, or the like, have been known. In this embodiment, however, porous silicone rubber created without using hollow balloons was used. That is, porous silicone rubber obtained by using the material obtained by dispersing water in the addition-curable liquid silicone rubber compound, as the material, and dehydrating the compound which contains water, was used.

In the case of this porous silicone rubber, its material was heated to cure the silicone rubber in an environment which prevents water evaporation. Then, water was removed from the cured silicone rubber, which contains water, to make the cured silicone rubber porous. During this process, adjacent pores become connected to each other, preventing thereby the pressure roller 110 from excessively changing in diameter due to the thermal expansion of the gases in the pores, and also, due to the pressure increase which occurs as the elastic layers are compressed.

The thickness t1 of the first elastic layer 116A is no less than 50 μm and no more than 1000 μm. An elastic layer which is no more than 50 μm is difficult to form, and also, unsatisfactory in terms of its effect to reduce the fixing apparatus 100 in the length of startup time. On the other hand, an elastic layer which is no less than 1000 μm sometimes fails to satisfactorily prevent the out-of-sheet-path portions of the pressure roller 110 from excessively increasing in temperature. Thus, a preferable range for the thickness t1 of the first elastic layer 116A is no less than 50 μm and no more than 500 μm, because, in order to improve an image forming apparatus in printing performance by satisfactorily preventing the out-of-sheet-path portion of the pressure roller from excessively increasing in temperature, in the recent environment in which image forming apparatuses are increased in printing performance, and therefore, the out-of-sheet-path portions of the pressure roller are more likely than ever to excessively increase in temperature, the first elastic layer 116A has to be reduced in thickness.

The ratio with which the adjacent pores in the first elastic layer 116A are in connection to each other is desired to be no less than 70% and no more than 100%. If it is no less than 70%, the pressure roller 110 is less likely to contribute to the formation of images which are nonuniform in gloss. The higher it is, the less likely for the pressure roller 110 to contribute to the formation of images which are nonuniform in gloss.

As for the thermal conductivity λ1 of the first elastic layer 116A in terms of the thickness direction of the first elastic layer 116A, it is desired to be no less than 0.06 W/(m·K), and no more than 0.16 W/(m·K), for the following reason. That is, if the first elastic layer 116A is no more than 0.06 W/(m·K) in thermal conductivity, it is excessively porous, being therefore smaller in rubber content. Therefore, it is difficult to form, and/or is less durable as the elastic layer for the pressure roller 110. On the other hand, if the thermal conductivity of the first elastic layer 116A in terms of the thickness direction of the first elastic layer 116A is no less than 0.16 W/(m·K), the first elastic layer 116A is less effective to reduce the fixing apparatus 100 in the length of startup time.

The porosity of the first elastic layer 116A, which can be obtained with the use of the following equation is desired to be no less than 20% and no more than 70% in volume. If it is no more than 20% in volume, it is difficult to achieve the above-described ratio of connection among adjacent pores. A pressure roller 110, which is no less than 70% in porosity is rather small in rubber content, and therefore, is difficult to form. The higher the first elastic layer 116A, the shorter the fixing apparatus 100 is in the length of startup time. Thus, the first elastic layer 116A is desired to be no less than 35% and no more than 70% in porosity in terms of volume.

The porosity of the first elastic layer 116A can be obtained with the use of the following mathematical equation. More concretely, first, a randomly selected portion of the first elastic layer 116A is cut out with the use a razor blade. Then, the volume (abovementioned VA11) of this piece (sample) of the first elastic layer 116A is measured in volume at 25° C. with the use of a specific gravity measuring equipment of liquid immersion type (SGM-6: product of Mettler Toledo Co., Ltd.). Then, the sample is heated for an hour at 700° C. in nitrogen gas with the use of a thermal weight measuring apparatus (TGA851e/SDTA (commercial name): product of Mettler Toledo Co., Ltd.) to remove the silicone rubber components by dissolving it. The amount in weight by which the sample loses through this procedure is referred to as Mp.

Then, the volume (abovementioned VA) of the sample is measured at 25° C. with the use of a dry automatic densitometer (AccuPyc 1330-1 (commercial name): produce of Shimzu Corp.). The porosity of the first elastic layer 116A can be obtained with the use of the following mathematic equation, based on these values. By the way, the density of the silicone rubber component was assumed to be 0.97 g/cm³ (which hereafter is referred to as ρP).

Porosity (volumetric percentage)=[{$VA11-(Mp/\rho P+VA)$}/$VA11$]×100

By the way, in this embodiment, the average porosity of the five samples randomly cut out of the first elastic layer 116A was used as the porosity of the first elastic layer 116A.

c) Second Elastic Layer 116B

The second elastic layer 116B is a layer of pure solid rubber, or solid rubber which contains thermally highly conductive filler, for the following reason. That is, by making the second elastic layer 116B greater in the thermal conductivity in its thickness direction than the first elastic layer 116A, it is possible to minimize the pressure roller 110 in the amount by which the out-of-sheet-path portions of the pressure roller 110 excessively increase in temperature. In order to form the second elastic layer 116B which is excellent in thermal conductivity, at least one of such thermally highly conducive fillers as alumina, zinc oxide, silicon carbide, and graphite was added to the base polymer of the second elastic layer 116B. Thus, the second elastic layer 116B is substantially higher in thermal conductivity than the first elastic layer 116A.

The second elastic layer 116B is formed of a mixture of addition-curable liquid silicone rubber and thermally highly conductive filler. The shape of the thermally conductive filler is optional. That is, the filler may in the form of a needle, a flake, or a sphere. Generally speaking, the greater rubber is in the filler content, the harder rubber tends to be. Thus, filler type, filler content, and the hardness of the base rubber should be determined base on the thermal properties and hardness of which the second elastic layer 116B is required.

The thermal conductivity of the second elastic layer 116B in terms of the thickness direction is desired to be in a range of 0.2 W/(m·K)–2.0 W/(m·K). If it is no more than 0.2 W/(m·K), the second elastic layer 116B is sometimes ineffective to minimize the out-of-sheet-path temperature increase. On the other hand, an elastic layer (second elastic layer 116B) which is no less than 2.0 W/(m·K) in thermal conductivity is sometimes difficult to form, and/or mixing of a large amount of highly thermally conductive filler into the base rubber sometimes makes it difficult to provide the second elastic layer 116B with a satisfactory amount of elasticity for forming the nip.

The higher the second elastic layer 116B is in the thermal conductivity λ2 in its thickness direction, the greater is the amount by which it allows the heat in the pressure roller 110 to conduct to the metallic core 117, in the thickness direction of the second elastic layer 116B, and then, conducts through the metallic core 117 in the lengthwise direction of the metallic core 117. Therefore, the pressure roller 110 is more likely to become uniform in the amount of heat, and therefore, is more likely to minimize the amount of the out-of-sheet-path temperature increase.

It is desired that the second elastic layer 116B is no less than 1% in volume and no more than 60% in volume, in thermally highly conductive filler content. If the second elastic layer 116B is no more than 1% in volume in the thermally highly conductive filler, it sometimes fails to deliver the expected amount of thermal conductivity. On the other hand, an elastic layer (second elastic layer 116B) which exceeds 60% in volume in the thermally highly conductive filler content is sometimes difficult to form, and/or filling the base rubber with a large amount of thermally highly conductive filler sometimes makes it difficult to provide the second elastic layer 116B with a sufficient amount of elasticity for forming the nip.

The method for measuring the thermally highly conductive filler content (% in volume) in the second elastic layer 116B is as follows. That is, first, sample pieces are cut out of the second elastic layer 116B, and their volume (which hereafter is referred to as VA11) is measured at 25° C. with the use of a specific gravity measuring apparatus of liquid immersion type (SGM-6: product of Mettler Toledo Co., Ltd.). Then, the samples are heated for an hour at 700°C in an ambience of nitrogen gas with the use of a thermal weight measuring apparatus (TGA851e/SDTA (commercial name): product of Mettler Toledo Co., Ltd.) to remove the silicone rubber by dissolving it.

Then, the volume of remaining thermally highly conductive filler is measured at 25° C. with the use of a dry automatic densitometer (AccuPyc 1330-1 (commercial name): produce of Shimzu Corp.) (this volume is referred to as VB, hereafter). The ratio in volume of the thermally highly conductive filler can be obtained based on these values.

d) Stress Reduction Layer 116C

The pressure roller 110 is provided with the stress reduction layer 116C, which also is an elastic layer. The stress reduction layer 116C is placed between the first elastic layer 116A and second elastic layer 116B. It is formed of a rubber, the material for which is addition-curable liquid silicone rubber. The stress reduction layer 116C is a nonporous rubber layer, or a solid rubber layer, and is formed by controlling the liquid silicone rubber, as the material for the second elastic layer 116B, in the amount by which water is evaporated from the liquid silicone rubber, when the material for the second elastic layer 116B is heated to cure the silicone rubber. By the way, the first elastic layer 116A and stress reduction layer 116C can be simultaneously formed together.

The relationship among the indentation elastic modulus $E_{1T3}$ of the stress reduction layer 116C, indentation elastic modulus $E_{1T1}$ of the first elastic layer 116A (surface layer side), and indentation elastic modulus $E_{1T2}$ of the second elastic layer 116B (metallic core side), satisfy the following requirement (inequality). By the way, the smaller a given substance is in indentation elastic modulus, the softer the substance is.

$E_{1T1} < E_{1T3} < E_{1T2}$

If the relationship among the stress reduction layer 116C, first elastic layer 116A and second elastic layer 116B in terms of indentation elastic modulus is: $E_{1T1} < E_{1T2} < E_{1T3}$, unlike the requirement given above, damages are likely to occur at the interface between the first elastic layer 116A and stress reduction layer 116C. Further, if it is: $E_{1T3} < E_{1T1} < E_{1T2}$, unlike the requirement given above, damages are likely to occur at the interface between the stress reduction layer 116C and first elastic layer 116A, or second elastic layer 116B.

e) Release Layer 118

The pressure roller 110 is provided with a release layer 118, as a toner releasing layer, which is formed of perfluoroalkoxy resin (PFA) on the elastic layer 116. The release layer 118 may be formed by covering the first elastic layer 116A with a piece of tube formed of perfluoroalkoxy resin, or coating the first elastic layer 116A with perfluoroalkoxy resin, like the release layer 117 of the fixation film 112. In this embodiment, a piece of tube formed of perfluoro-alkoxy resin, which is excellent in durability even under a high-temperature and high-pressure ambience, was used. As the material for the release layer 118, fluorine resin such as PTFE and FEP, fluorine rubber, silicone rubber, or the like, which excels in release properties, may be used other than PFA.

(Method for Manufacturing Pressure Roller)

In this embodiment, the following method is used as the method for manufacturing the pressure roller 110. That is, first, a combination of the first elastic layer 116A and release layer 116C is formed on the inward surface of the release layer 118. Then, the first elastic layer 116A is formed.

1) Cross-Linking Curing of Addition-Curable Liquid Silicone Rubber

The material for the first elastic layer 116A can be made by mixing addition-curable liquid silicone rubber with water or filler, and curing the mixture by cross-linking. As for the material for the second elastic layer 116B, it can be made by mixing the addition-curable liquid silicone rubber with filler, and curing the mixture by cross-linking.

Addition-curable liquid silicone rubber is uncross-linked silicone rubber which has organo-polysiloxane (A) having unsaturated bond such as vinyl group, and orogano-polysyloxane (B) having Si—H bond. As it is subjected to heating or the like process, Si—H reacts to unsaturated bond of vinyl group, causing cross-linking. Consequently, the liquid silicone rubber cures. It has been known that the properties of a substance which results as a mixture of the aforementioned (A) and (B) is cured are affected by the ratio between (A) and (B). Ordinarily, they are sold together in a package.

In this embodiment, DY35-561 (product of Dow Corning Toray Co., Ltd.) was used as addition-curable liquid silicone rubber. By the way, generally speaking, it is common practice to mix platinum compound, as catalyst, in (A) and (B) to facilitate cross-linking reaction. Further, this liquid silicone rubber of the addition-curing type may be adjusted in fluidity, within a range in which the adjustment does not contradict the object of the present invention. That is, fillers which are not listed in this specification may be contained in the materials for the first elastic layer 116A and those for the second elastic layer 116B, as means for dealing with known issues.

2) Preparation For Formation of Release Layer

Figure 4:
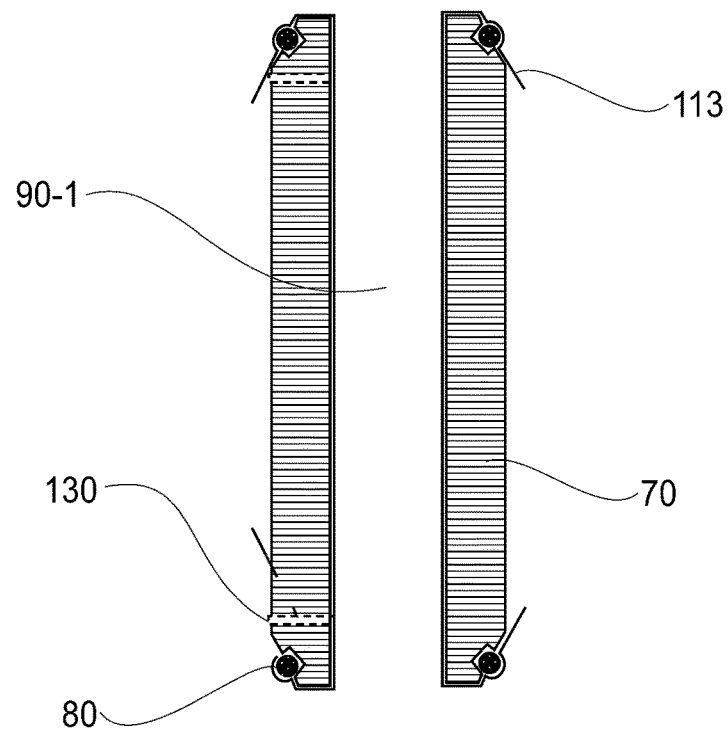
FIG. 4 is a drawing for describing the method for forming the pressure roller in the first embodiment, with the use of a mold.

Referring to FIG. 4, a piece of tube formed of fluorinated resin, which will become the release layer 118, is inserted into a cylindrical mold 70 with the use of a known means, and is fixed to the mold by being folded back. Then, a layer of adhesive is formed on the inward surface of the piece of tube. In this embodiment, a piece of cylinder formed of SUS, which was 20 mm in internal diameter, 30 mm in external diameter, and 250 mm in length, was used as the cylindrical mold 70. This cylindrical mold 70 is provided with a pair of sets of auxiliary end pieces 50. It is fitted with a pair of O-rings 80 which face the sets of auxiliary pieces 50 to seal between the cylindrical mold 70 and the end pieces 50 during the process for manufacturing the process roller 70 with the use of the cylindrical mold 70, which will be described later. Further, the cylindrical mold 70 is provided with a side hole 130 through which the piece of fluorinated resin tube can be suctioned from outside the cylindrical mold 70 to keep the piece of resin tube airtightly attached to the inward surface of the cylindrical mold 70.

As the piece of fluorinated resin tube, a piece of PFA tube, which was 19.3 mm in diameter, 30 μm in thickness, and 350 mm in length, was used. The adhesive layer is formed by coating the inward surface of the PFA tube with Primer DY39-067 (product of Dow Corning Toray Co., Ltd.), with the use of such a method as a droplet applying method and a spin coating method.

3) Process For Preparing Material for First Elastic Layer 116a

A preset amount of pure water is prepared with the use of a balance, and is mixed into uncross-linked addition-curable liquid silicone rubber. Pure water does not mix well with liquid silicone rubber. Therefore, thickener is added to the mixture of the liquid silicone rubber and pure water to turn the mixture into gel. Further, emulsifier is added to the gel. Then, the resultant mixture (gel) is stirred with the use of such a known mixing means as a multi-purpose stirring machine to yield the liquid compound as the material for the first elastic layer 116A, which is in the form of emulsion.

In this embodiment, "Wenger W 200U" (commercial name: product of Hojun Co., Ltd.) was used as thickener. As the emulsifier, nonionic surfactant (sorbitan fatty acid ester, commercial name of which is "Ionet" (product of Sanyo Chemical Industries Co., Ltd.) was used. By the way, the first elastic layer 116A can be changed in porosity by adjusting the amount by which the hydrous gel is added, in order to control the first elastic layer 116A in the thermal conductivity in its thickness direction. In this embodiment, adjustment was made so that the ratio in weight between the water and silicone rubber became 1:1 in weight.

4) Process for Forming First Elastic Layer 116A and Stress Reduction Layer 116C

Figure 5:
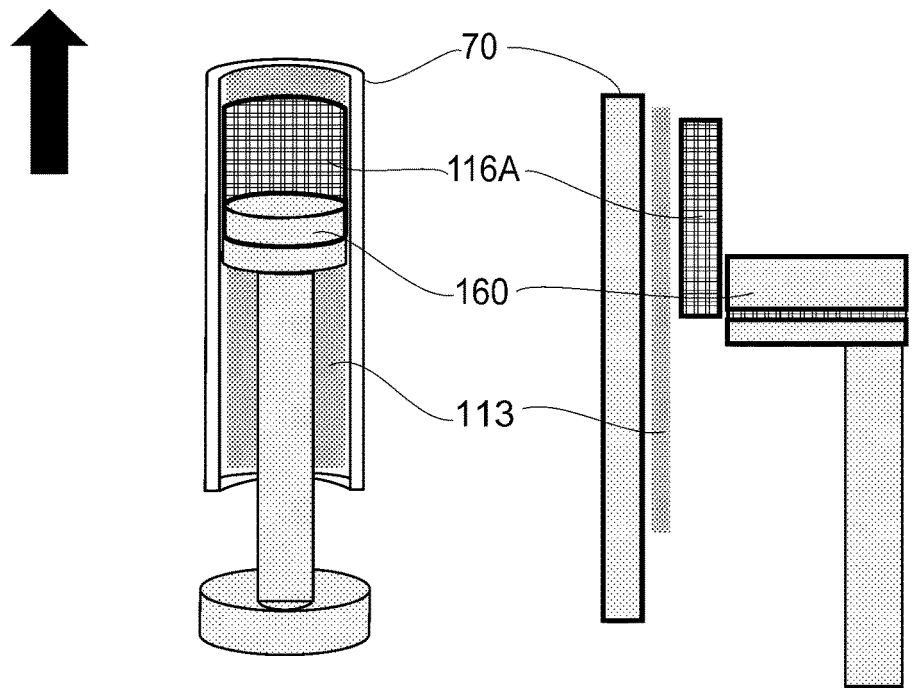
FIG. 5 is a drawing for describing the method for forming the pressure roller in the first embodiment, with the use of a mold.
Figures 6, 7:
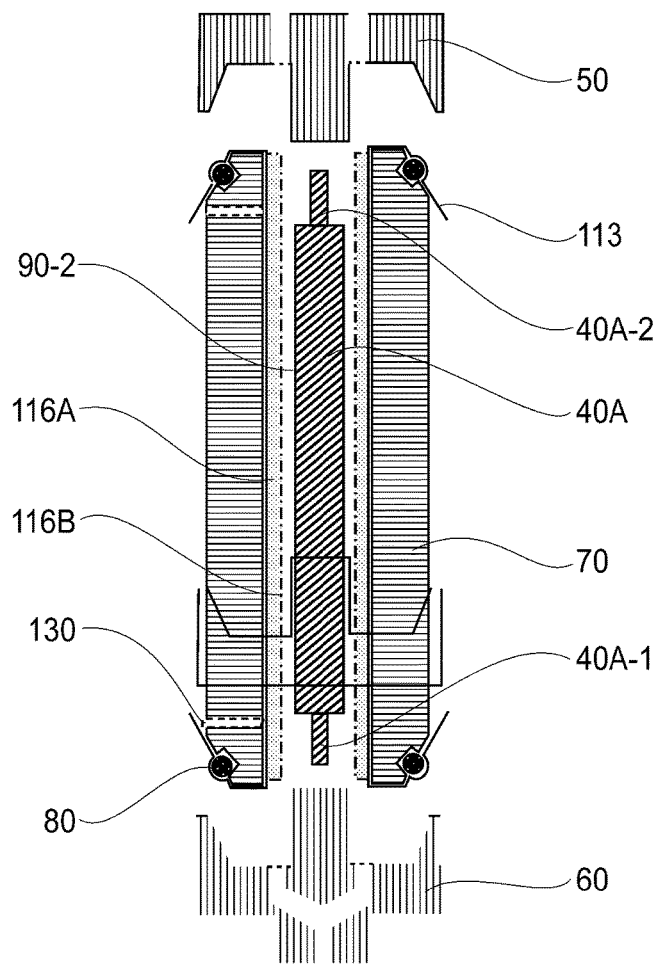
FIG. 6 is a drawing for describing the method for forming the pressure roller in the first embodiment, with the use of a mold.
FIG. 7 is a table for describing the effectiveness of the pressure roller in the first embodiment.

As schematically shown in FIG. 6, the liquid compound prepared through the above-described Process 3) is coated on the inward surface of the release layer 113 by moving a ring-coating head through a cavity 90-2, which is the hollow (internal space) of the cylindrical mold 70, with the use of a known ring-coating method. In FIG. 5, the cylindrical mold 70 is moved upward (indicated by arrow mark). However, the coating head may be moved downward while the cylindrical mold 70 is kept stationary.

After the coating, a combination of the cylindrical mold 70, liquid compound layer 140-1, and release layer 113, was heated for no less than 10 minutes at a temperature level which is in a range of 60-120° C. to cure the liquid compound layer 140-1, in order to cure the layer of silicone rubber, which contains water, to yield a cured silicone rubber layer, on the inward surface of the release layer 113. During this process, water is allowed to evaporate from the exposed (to ambient air) side (opposite side from release layer 113) of the ring-coated material, while water is prevented from evaporating from the release layer side. Thus, a layer of cured silicone rubber which is nonuniform in water content in terms of its thickness direction is formed on the opposite side of the release layer 113. Then, the combination is heated at no less than 130° C., in order to completely eliminate water from the silicone rubber. In other words, the first elastic layer 116A and stress reduction layer 116C are simultaneously formed together.

5) Process for Preparing Material For Second Elastic Layer 116B

A preset amount (measured by balance) of thermally highly conductive filler is mixed into uncross-linked addition-curable liquid silicone rubber mentioned in the description of Process 1). In this embodiment, in order to obtain liquid compound for forming the second elastic layer 116B, highly pure alumina (spherical alumina particles) (Alumina beads CB-A30S (commercial name): product of Showa Denko K.K.) is added so that its volumetric ratio to the resultant combination became 47%. By the way, as for the mixing means, such a known mixing means as a multipurpose mixing-stirring machine of the so-called planetary type was used. If necessary, the mixture is subjected to a defoaming process to yield the final mixture as the liquid compound as the material for the second elastic layer 116B.

6) Process for Forming Second Elastic Layer 116B

The second elastic layer 116B is formed with the use of an injection molding method. That is, referring to FIG. 6, the metallic core 117 coated with primer is inserted into the cylindrical mold 70 in which the first elastic layer 116A and stress reduction layer 116C are present. Then, a set of end pieces 50 and a set of end pieces 60 are attached to the lengthwise ends of the cylindrical mold 70 to form the cavity for forming the second elastic layer 116B. Then, the liquid compound for forming the second elastic layer 116B is injected into the cavity. Then, the combination of the metallic mold assembly, first elastic layer 116A, stress reduction layer 116C, and the liquid compound for the second elastic layer 116B is heated for no less than 20 minutes at 130☐C to cure the liquid compound for forming the second elastic layer 116B by cross-linking.

Thereafter, the pressure roller 110, or the combination of the metallic core 117, first elastic layer 116A, stress reduction layer 116C, second elastic layer 116B, and release layer 113, is moved out of the cylindrical mold 70. Then, the combination is subjected to the secondary cross-linking process to yield the final pressure roller 110.

(Evaluation of Pressure Roller)

1) Evaluation in Terms of Compression Elasticity $E_{1T}$

The compression elasticity of an elastic layer is measurable with the use of a hardness measuring system (Fischer Scope HM2000 XYp (commercial name): product of Fischer Instrument K.K.) for measuring the hardness of a microthin layer. The reason for using this hardness measuring system is for grasping the difference in elasticity among the integrated subordinate layers, of which the elastic layer is formed.

As the measurement head for the measuring apparatus, a Vickers indenter which is in accordance with ISO 14577 was used. The indenter is made of diamond, is in the form of a quadrangular pyramid, and is 136° in facial angle. The head is pushed into the aforementioned samples cut out of the elastic layer of the pressure roller 110, to a depth of 20 μm from the surface of the sample, at a speed of 1 μm/sec. By the way, the samples obtained by cutting the elastic layer of the pressure roller 110 into rings, which are roughly 5 mm wide in terms of the lengthwise direction of the pressure roller 110. Then, the head is perpendicularly pushed into the elastic layer ring, from the ring surface which is perpendicular to the lengthwise direction of the pressure roller 110, and is held for five seconds. Then, the head is moved away from the sample at 1 μm/sec.

The compression elasticity $E_{1T}$ of the elastic layer is obtainable with the use of the following formula (1), which is in accordance with ISO 14577, based on the inclination of the curved line obtained by plotting the relationship between the amount by which the head is displaced while the load is removed from the head (while head is moved in direction to move load from sample), and the amount of load to which the head is being subjected while the load is removed, and also, while the load is in a range of 60%-95% of the largest amount of load.

$$E_{rr} = \frac{1-(v_s)^2}{\frac{1}{E_r} - \frac{1-(v_i)^2}{E_i}} \qquad (1)$$

Vs: Poisson's ratio of test sample
Vi: Poison's ratio of head
Er: elasticity modulus at point of contact while head is being moved in direction to allow a test sample to decompress.
Ei: elasticity modulus of head In order to calculate the indentation elastic modulus $E_{1T}$, the Poisson's ratio Vs in the formula is substituted by the Poisson's ratio of the test sample. In the case of the first elastic layer 116A formed of porous silicone rubber, 0.2 was used as the Poisson's ratio. In the cases of the second elastic layer 116B and stress reduction layer 116C, 0.5 was used as their Poisson's ratio. By the way, the depth to which head is pressed into the test sample may be changed according to the thickness of the stress reduction layer 116C. In this embodiment, $E_{1T1}$=0.8 [MPA]; $E_{1T2}$=1.3 [MPA]; and $E_{1T3}$=1.0 [MPA].

2) Effectiveness of this Embodiment

In order to confirm the effectiveness of this embodiment, the following tests were conducted. For the evaluation the pressure roller 110 in terms of durability, sheets of recording medium of size A4, which are 80 g/m² in basis weight, were continuously fed into the image forming apparatus 50 until 225,000 prints, which corresponds to the expected length of life span of the apparatus 50, was outputted. Then, the pressure roller 110 was examined for the presence of defects. The image forming apparatus 50 used for the tests was a laser beam printer, which was 273 mm/sec in process speed, being therefore capable of outputting 50 prints per minute.

For comparison, a pressure roller which did not have the stress reduction layer was tested. FIG. 7 shows the test results.

In the case of the comparative pressure roller, its first elastic layer began to break down after the image forming apparatus was operated for a length of time which is equivalent to ⅔ the life expectancy of the image forming apparatus. In the case of the pressure roller in this embodiment, even after it was operated for 1.5 times the life expectancy of the image forming apparatus, no image was found. Thus, the effectiveness of this embodiment was confirmed.

«Embodiment 2»

Next, the second embodiment of the present invention is described. This embodiment is different from the first one in that the first elastic layer is formed of porous rubber which contains hollow filler (hollow balloons) as filler. More specifically, the elastic layer of the pressure roller in this embodiment has three subordinate elastic layers (which will be referred to simply as elastic layers, which are a thermally insulative layer (first elastic layer) formed of porous rubber which contains hollow filler; a stress reduction layer formed of nonporous rubber, and a heat storage layer (second elastic layer) which contains thermally highly conductive filler. Further, the pores in the first elastic layer are in connection to their adjacent pores.

Thus, not only can it reduce a fixing apparatus having a pressure roller as a fixing member, in the length of startup time, but also, can prevent the out-of-sheet-path portions of the fixing apparatus from excessively increasing in temperature when a substantial number of small sheets of recording paper are conveyed through the fixing apparatus. The fixing apparatus in this embodiment, and the image forming apparatus which employs the fixing apparatus in this embodiment, are the same in structure as those in the first embodiment. Therefore, they are not described. Next, the pressure roller in this embodiment is described.

(First Elastic Layer 116A)

In this embodiment, porous silicone rubber which contains hollow filler is used as one of the materials for the pressure roller. As hollow fillers, various products such as hollow filler formed of resin, hollow filler formed of glass, for example, have been known. In this embodiment, hollow particles (beads) (Matsumoto Micro-sphere-F-80DE: product of Matsumoto Yushi-Seiyaku Co., Ltd.), which are formed of resin and roughly 100 μm in average diameter, are used.

An elastic layer formed of porous silicone rubber, the pores of which are independent from each other, are likely to be excessively affected by the expansion of the pores attributable to increase in temperature, and the increase in the internal pressure of the pores, which occurs as the elastic layer (pressure roller) is pressed. Therefore, in this embodiment, in order to yield an elastic layer, the pores of which are in connection to their adjacent pores, through passages created by the vaporization of volatile components in the silicone rubber, ethylene glycol was added, as pore-connection agent, in the liquid silicone rubber of the addition-cross-linking type, as the base rubber for the elastic layer.

(Second Elastic Layer 116B)

The second elastic layer 116B in this embodiment is the same as that in the first embodiment. That is, it is formed of rubber alone, or rubber which contains thermally highly conductive filler.

(Stress Reduction Layer 116C)

The material for the stress reduction layer 116C in this embodiment is exactly the same as the base rubber for the first elastic layer 116A.

(Method for Manufacturing Pressure Roller)

Process 1) for curing addition-curable liquid silicone rubber by cross-linking, and Process 2) for preparing the material for the release layer, in this embodiment, are the same as those in the first embodiment.

3) Process for Preparing Material for First Elastic Layer 116A

Hollow filler and liquid silicone rubber are measured in advance with the use of a balance so that the ratio in weight of the hollow filler relative to the rubber became 5:1. Then, the former is mixed into the uncross-linked addition-curable liquid silicone rubber. Then, ethylene glycol is added as pore-connection agent to the mixture by one part in weight. Then, the resultant mixture is given additional stirring/mixing. After the mixture is satisfactorily stirred and mixed, the mixture is defoamed to yield the compound as the material for the first elastic layer 116A in this embodiment.

4) Process for Forming First Elastic Layer 116A

Figure 8:
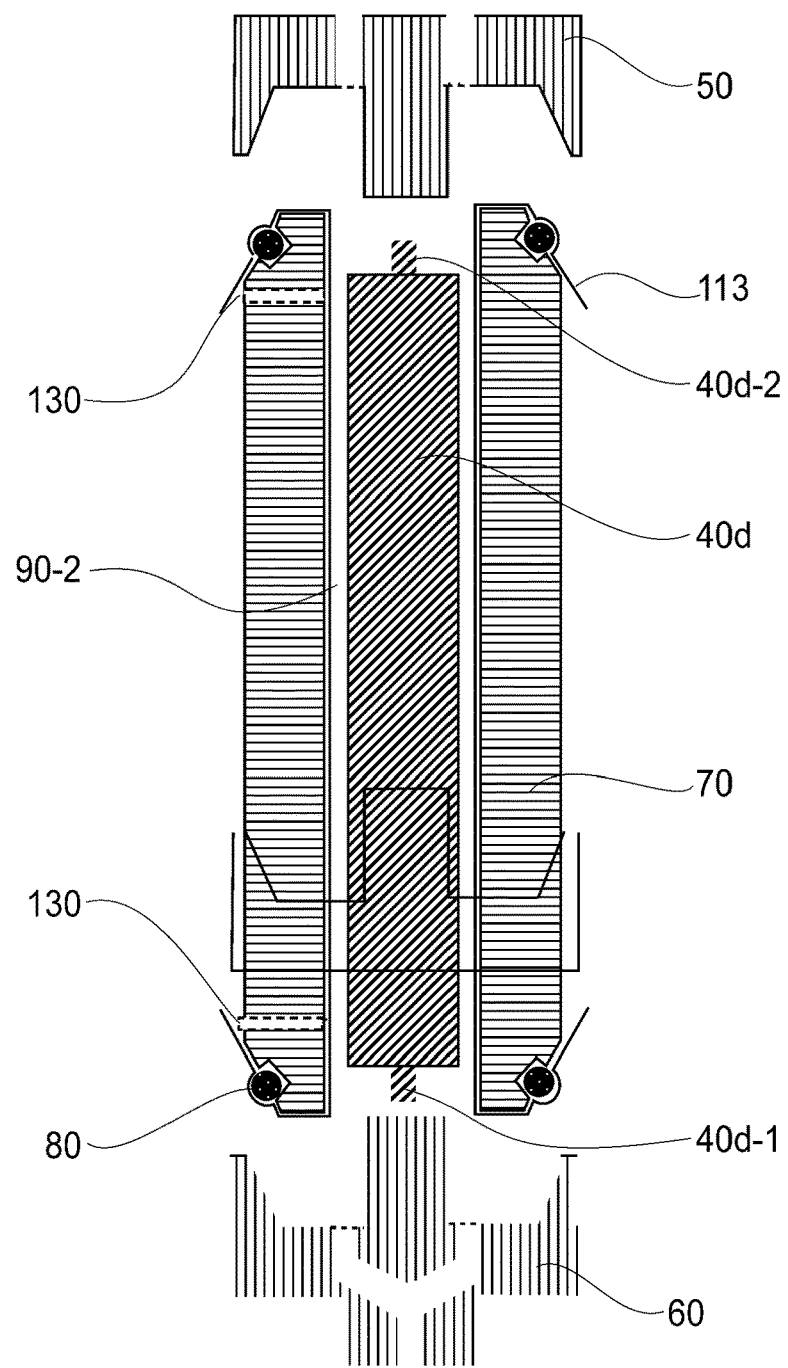
FIG. 8 is a drawing for describing the method for forming the pressure roller in the second embodiment of the present invention, with the use of a mold.

In this embodiment, the first elastic layer 116A is formed with the use of an injection molding method. That is, referring to FIG. 8 which is a schematic drawing for showing the method for forming the first elastic layer 116A, a center piece 40A (19.3 mm in external diameter, 255.0 mm in overall length; its shaft portions 40d-1 and 40d-2 are 8.0 mm in length) is prepared. Then, the cylindrical mold 70, to the inward surface of which the release layer has been fixed, a set of end pieces 50, and a pair of end pieces 60 are put together to form a cavity 90-2.

Then, the compound prepared in Process 3), described above, for forming the first elastic layer 116A is injected into the cavity 90-2. Then, the cylindrical mold 70 in which the compound is present is heated for no less than 20 minutes at 130° C. to cure, by cross-linking, the compound for forming the first elastic layer 116A. Thereafter, the center piece 40d is moved out of the cylindrical mold 70, yielding a combination of the release layer and first elastic layer 116A, which were integrated in the cylindrical mold 70.

5) Process for Preparing Material for Stress Reduction Layer 116C

The addition-curable liquid silicone rubber mentioned in the description of Process 4) for curing the addition-curable liquid silicone rubber in the first embodiment is used with no modification. That is, the liquids A and B (DY35-561: product of Toray-Dow-Corning Co., Ltd.) are thoroughly mixed at a weight ratio of 1:1 to prepare the liquid compound as the material for forming the stress reduction layer 116C.

6) Process for Forming Stress Reduction Layer 116C

A known ring-coating method which is similar to the one used in Process 4) in the first embodiment to form the first elastic layer 116A and stress reduction layer 116C is used. More specifically, in order to form the stress reduction layer 116C, the material for the stress reduction layer 116C is coated on the inward surface of the first elastic layer 116A, by moving the coating head in the cavity of the cylindrical mold 70, as in the Process 4) in the first embodiment, while maintaining a gap of 150 microns between the head and the inward surface of the cylindrical mold 70. Then, the combination of the cylindrical mold 70, first elastic layer 116A, and the coated material for the stress reduction layer 116C is heated for no less than 20 minutes at 130° C.

7) Process for Forming Second Elastic Layer 116B

Next, the second elastic layer 116B is formed with the use of a method similar to those used in Processes 5) and 6) in the first embodiment. Then, the precursor of the pressure roller 110 is moved out of the cylindrical mold 70, and is subjected to the process for causing the secondary cross-linking to yield the final product, or a pressure roller having the metallic core, second elastic layer 116B (formed on peripheral surface of metallic core), stress reduction layer 116C (formed on peripheral surface of second elastic layer 116B), and first elastic layer 116A (formed on outward surface of stress reduction layer 116C.

(Evaluation of Pressure Roller)

1) Evaluation in Terms of Indentation Elastic Modulus $E_{1T}$

In order to evaluate the pressure roller in terms of its indentation elastic modulus, the elastic layer of the pressure roller obtained through the above-described processes was cut to yield a ring of elastic layer which is roughly 5 mm thick in terms of the direction parallel to the lengthwise direction of the pressure roller. A value obtained by compressing a portion of the first elastic layer 116A, which corresponds in position to a pore, is different from a value obtained by compressing a portion of the first elastic layer 116A, which corresponds in position to the structural portion (frame portion) of the elastic layer. Thus, a sample positioning system is used so that a portion having pores will be compressed. In the case of this embodiment, the indentation elastic modulus of the first elastic layer 116A (surface side) was 0.4 in ($E_{1T1}$=0.4 MPA, and that of the second elastic layer 116B (core side) was 1.3 MPA ($E_{1T2}$=1.3 MPA). The indentation elastic modulus of the stress reduction layer 116C was 1.2 MPA ($E_{1T3}$=1.2 MPA).

That is, also in the case of this embodiment, the stress reduction layer 116C, first elastic layer 116A, and second elastic layer 116B satisfy the following requirement (inequality) in terms of indentation elastic modulus ($E_{1T}$).

$E_{1T1} < E_{1T3} < E_{1T2}$

2) Effectiveness of this Embodiment

In order to confirm the effectiveness of this embodiment, the following tests were conducted. For the evaluation the pressure roller 110 in terms of durability, sheets of recording medium of size A4, which are 80 g/m² in basis weight, were continuously fed into the image forming apparatus until 225,000 of prints, which corresponds to the expected length of life span of the apparatus. Then, the pressure roller 110 was examined for the presence of defects. The image forming apparatus used for the tests was a laser beam printer, which was 273 mm/sec in process speed, being therefore capable of outputting 50 prints per minutes. For comparison, a pressure roller which did not have the stress reduction layer was tested. FIG. 7 shows the test results.

In the case of the comparative pressure roller, its first elastic layer began to break down after the image forming apparatus was operated for a length of time which is equivalent to ⅔ times the life expectancy of the image forming apparatus. In the case of the pressure roller in this embodiment, even after it was operated for 1.5 times the life expectancy of the image forming apparatus, no damage was found. Thus, the effectiveness of this embodiment was confirmed.

In the foregoing, a couple of preferred embodiments of the present invention were described. These embodiments, however, are not intended to limit the present invention in scope. That is, the present invention is also compatible with various fixing apparatuses and image forming apparatuses, which are different from those in the preceding embodiments, within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-122924 filed on Jun. 23, 2017, which is hereby incorporated by reference herein in its entirety.

What is claimed is:

1. A roller usable in a fixing device for fixing, on a recording material, an unfixed toner image formed thereon, said roller comprising:
   a first elastic layer;
   a second elastic layer provided closer to a center of said roller than said first elastic layer, said second elastic layer having a thermal conductivity in a thickness direction higher than that of said first elastic layer;
   a third elastic layer provided between said first elastic layer and said second elastic layer,
   wherein an indentation elastic modulus EIT1 of said first elastic layer, an indentation elastic modulus EIT2 of said second elastic layer, and an indentation elastic modulus of said third elastic layer satisfy:
   $E_{1T1} < E_{1T3} < E_{1T2}$.

2. The roller according to claim 1, further comprising a core metal provided closer to the center than said second elastic layer.

3. The roller according to claim 1, wherein said first elastic layer has a thickness of 50 μm to 1000 μm.

4. The roller according to claim 1, wherein the thermal conductivity of said first elastic layer in the thickness direction thereof is 0.06W/(m·K) to 0.16W/(m·K), and the thermal conductivity of said second elastic layer in the thickness direction thereof is 0.2W/(m·K) to 2.0W/(m·K).

5. The roller or according to claim 4, wherein said first elastic layer is made of porous silicone rubber.

6. The roller according to claim 5, wherein said first elastic layer includes pores, and porosity thereof is 20% by volume to 70% by volume.

7. The roller according to claim 6, wherein a part of the pores are interconnected to provide open pores with open pore ratio of 70% to 100%.

8. The roller according to claim 5, wherein the pores are provided by a hollow filler in said first elastic layer.

9. The roller according to claim 4, wherein said second elastic layer is a solid rubber layer comprising a thermo-conductive filler of at least one of alumina, zinc oxide, silicon carbide and graphite.

10. The roller according to claim 9, wherein a content of said thermo-conductive filler is 1% by volume to 60% by volume.

11. The roller according to claim 1, further comprising a parting layer outside said first elastic layer.

12. A fixing device comprising:
   a rotatable member; and
   a roller contacting an outside of said rotatable member to form a fixing nip between said rotatable member,
   wherein a recording material carrying an unfixed toner image is nipped and fed through said fixing nip so that the unfixed toner image is fixed on the recording material, wherein said roller includes:

a first elastic layer;

a second elastic layer provided closer to a center of said roller than said first elastic layer, said second elastic layer having a thermal conductivity in a thickness direction higher than that of said first elastic layer; and a third elastic layer provided between said first elastic layer and said second elastic layer, wherein an indentation elastic modulus EIT1 of said first elastic layer, an indentation elastic modulus EIT2 of said second elastic layer, and an indentation elastic modulus of said third elastic layer satisfy:

$E_{1T1} < E_{1T3} < E_{1T2}$.

13. The apparatus according to claim 12, wherein said rotatable member is a cylindrical film.

14. The apparatus according to claim 13, further comprising a heater contacting an inner surface of said film.

15. The apparatus according to claim 14, wherein said fixing nip is provided by said heater and said roller sandwiching said film.

* * * * *